United States Patent [19]

Frieberg

[11] 4,169,573

[45] Oct. 2, 1979

[54] JOINT ASSEMBLY

[75] Inventor: Murray Frieberg, Concord, Canada

[73] Assignee: Liberty Furniture Industries Limited, Concord, Canada

[21] Appl. No.: 936,264

[22] Filed: Aug. 22, 1978

[51] Int. Cl.² ............................................. F16B 12/40
[52] U.S. Cl. .................................... 248/188; 248/163; 403/217
[58] Field of Search ............... 403/217, 218, 219, 348, 403/240, 169, 170, 171, 172, 176; 248/188.1, 188, 163

[56] References Cited

U.S. PATENT DOCUMENTS

| 2,477,997 | 8/1949 | McArthur | 403/217 |
| 3,071,399 | 1/1963 | Cronin | 403/219 |
| 3,837,754 | 9/1974 | Malcik | 403/217 |

FOREIGN PATENT DOCUMENTS 1399355  4/1965  France ...................................... 403/347

Primary Examiner—Andrew V. Kundrat
Attorney, Agent, or Firm—Robert F. Delbridge; Arne I. Fors

[57] ABSTRACT

A joint assembly comprises a first tubular member and second and third members. The first tubular member has a first pair of apertures through which the second member extends, and a second pair of apertures longitudinally spaced along the length of the first tubular member from the first pair of apertures and through which the third member extends. Fastening means engage the second and third members within the first tubular member and force the second and third members towards one another into firm engagement with the edges of the first and second pair of apertures respectively in the first tubular member.

9 Claims, 4 Drawing Figures

JOINT ASSEMBLY

This invention relates to joint assemblies comprising a first tubular member and two other members secured together by fastening means, for example joint assemblies which are used in furniture construction to connect a pair of horizontal members to a tubular leg of an article of furniture.

Articles of furniture frequently comprise at least three tubular legs connected by horizontal members, and various prior attempts have been made to provide satisfactory ways of securely fastening the ends of a pair of horizontal members to a tubular leg. The joint must not only be of attractive appearance, but it must also be strong enough to withstand forces normally encountered in use of the article of furniture concerned. Further, in order to minimize expense, the joint should be relatively simple and also readily assembled. It is also advantageous if the joint can be readily disassembled when desired.

Known joint assemblies for this purpose do not satisfactorily meet all of these conditions, and therefore it is an object of the invention to provide an improved joint assembly of this kind.

According to the invention, a joint assembly comprises a first tubular member and second and third members, the first member having a first pair of apertures through which the second member extends, and a second pair of apertures longitudinally spaced along the length of the first tubular member from the first pair of apertures and through which the third member extends, and fastening means engaging the second and third members within the first tubular member and forcing the second and third members towards one another into firm engagement with the edges of the first and second pair of apertures respectively in the first tubular member.

Thus, a joint assembly according to the invention is attractive in appearance, since the fastening means is entirely within the first tubular member. Also, the operation of the fastening means to force the second and third members towards one another into firm engagement with the edges of the first and second pair of apertures respectively in the first tubular member results in a strong joint being achieved. Further, the fastening means can be such that the joint is readily assembled, or disassembled when desired.

The fastening means may comprise a screw with a head and a shank, the head engaging the exterior of one of the second and third members, and the shank passing through the one member and threadingly engaged in the other of the second and third members. The screw may be a self-tapping screw which taps a thread in a hole in the other member when the screw is screwed therein.

The first tubular member may be a substantially vertical leg supporting an article on the ground, and the other two members may be substantially horizontal members extending to other legs. The second and third members may also be tubular members.

One embodiment of the invention will now be described, by way of example, with reference to the accompanying drawing, of which:

Figure 1:
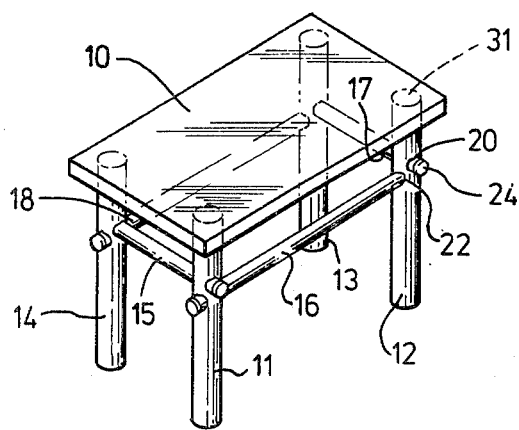
FIG. 1 is a perspective view of a small table.
Figure 4:
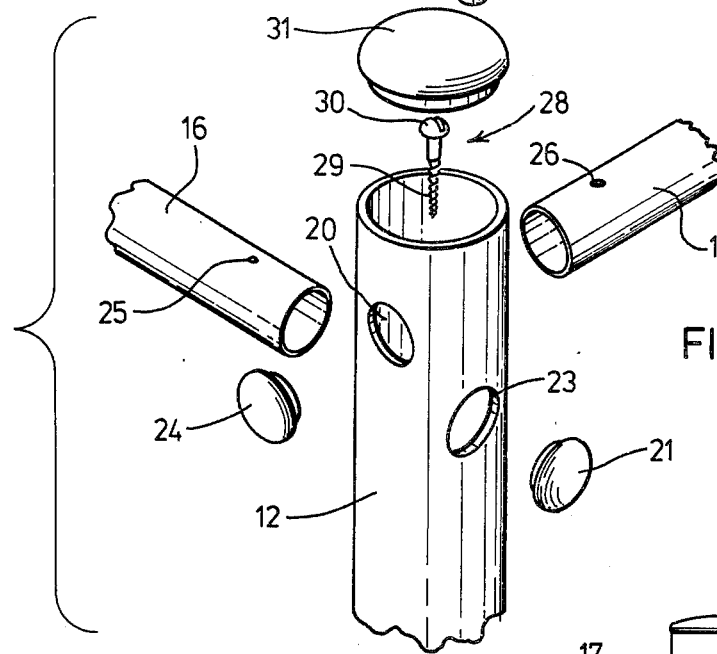
FIG. 4 is an exploded perspective view of the joint.
Figure 2:
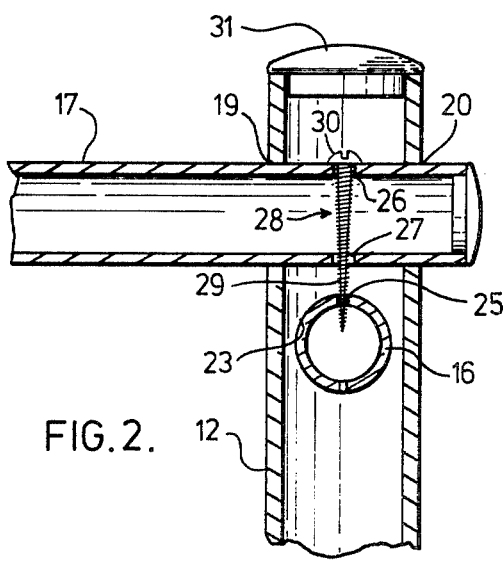
FIG. 2 is a sectional side view showing the joints between one leg and two horizontal members.
Figure 3:
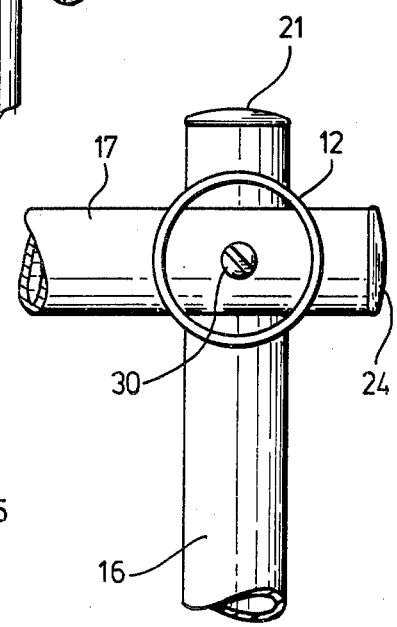
FIG. 3 is a plan view of the joint, with the upper end cap of the leg removed.

Referring to the drawings, a small table of the kind commonly referred to as a coffee table comprises a rectangular glass table top 10 supported by four tubular legs 11, 12, 13, 14 adjacent each corner of the table top 10 respectively. Horizontal tubular members 15, 16, 17, 18 extend between respective adjacent pairs of legs as shown. The legs 11–14 and the horizontal members 15–18 are tubular metal members with chrome-plated exterior surfaces.

Each leg 11–14 and the end portions of the respective adjacent horizontal members 15–18 are secured together by a joint assembly in accordance with the invention. For simplicity, only the joint assembly associated with the leg 12 and adjacent horizontal members 16, 17 will be described and illustrated in detail.

The leg 12 has a first pair of diametrically opposite apertures 19, 20 through which one end portion of the horizontal member 17 extends so as to project slightly therefrom, with the projecting end being closed by a cap 21. The size of the apertures 19, 20 is such that the horizontal member 17 is a close sliding fit therein. The leg 12 also has a second pair of diametrically opposite apertures 22, 23 located slightly below and with their axes perpendicular to the axes of the first pair of apertures 19, 20. One end portion of the horizontal member 16 extends through the apertures 22, 23 so as to project slightly therefrom, with the projecting end being closed by a cap 24. The size of the apertures 22, 23 is such that the horizontal member 16 is a close sliding fit therein.

The horizontal member 16 has a small hole 25 in its wall, the hole 25 being positioned such that when the horizontal member 16 is mounted in the apertures 22, 23, the hole 25 is centrally located within the leg 12 and is on the top of the horizontal member 16. The horizontal member 17 has a pair of diametrically aligned holes 26, 27 in its wall, the holes 26, 27 being slightly larger than the hole 25 in the horizontal member 16 and being positioned such that, when the horizontal member 17 is mounted in the apertures 22, 23, the holes 26, 27 are centrally located within the leg 12. Thus, the holes 26, 27 in the horizontal member 17 and the hole 25 in the horizontal member 16 are vertically aligned with each other.

When the horizontal members 16, 17 have been positioned as described above, a self-threading headed screw 28 is inserted downward into the leg 12 from the top, such that the tapered threaded shank 29 of the screw 28 passes through the holes 26, 27 in the horizontal member 17 and into the hole 25 in the top of the horizontal member 16. The screw 28 is then screwed into the hole 25, with the shank 29 self-threading a thread in the side wall of the hole 25, until the head 30 of the screw 28 engages the top of the horizontal member 17. The screw 28 is then tightened, with the result that the horizontal member 16 is pulled upwardly against the upper edges of the apertures 22, 23 and the horizontal member 17 is pulled downwardly against the lower edges of the apertures 19, 20 in the leg 12, thereby forming a firm joint between the horizontal member 16, 17 and the leg 12. The upper end of the leg 12 is then closed with a cap 31.

The horizontal members 15 to 18 are secured in the same manner to the respective other legs 11, 13 and 14. When the legs 11–14 and horizontal members 15–18 have been assembled in this manner, the glass top can simply be placed on top of the legs, as shown in FIG. 1.

It will be readily observed that the described joint assemblies are adequately strong, and are attractive in appearance since the fastening screws 28 are not visible in the finished joints. Also, the joints are extremely easy to assemble and disassemble. Further, the simplicity of the joints results in their cost being relatively low.

Other embodiments within the scope of the invention will be readily apparent to a person skilled in the art, the scope of the invention being defined in the appended claims.

What I claim as new and desire to protect by Letters Patent of the United States is:

1. A joint assembly comprising a first tubular member and second and third members, the first tubular member having a first pair of apertures through which the second member extends, and a second pair of apertures longitudinally spaced along the length of the first tubular member from the first pair of apertures and through which the third member extends, and fastening means engaging the second and third members within the first tubular member and forcing the second and third members towards one another into firm engagement with the edges of the first and second pair of apertures respectively in the first tubular member.

2. A joint assembly according to claim 1 wherein the fastening means comprises a screw with a head and a shank, the head engaging the exterior of one of the second and third members, and the shank passing through said one member and threadingly engaged in the other of said second and third members.

3. A joint assembly according to claim 2 wherein the screw is a self-threading screw which taps a thread in a hole in said other member when the screw is screwed therein.

4. A joint assembly according to claim 1 wherein the first tubular member is a substantially vertical leg supporting an article on the ground, and the other two members are substantially horizontal members extending to other legs.

5. A joint assembly according to claim 2 wherein the second and third members are also tubular members.

6. An article of furniture comprising at least three tubular legs with adjacent pairs of legs being connected by horizontal members, each leg having a first pair of apertures through which an end portion of one horizontal member extends, and a second pair of apertures spaced along the leg from the first pair of apertures and through which an end portion of another horizontal member extends, and fastening means within each leg engaging the end portions of the said one and another horizontal members and forcing the end portions of the said one and another horizontal members towards one another into firm engagement with the edges of the first and second pair of apertures respectively in the leg.

7. An article of furniture according to claim 6 wherein each fastening means comprises a screw with a head and shank, the head engaging the exterior of one of the respective two horizontal members, and the shank passing through said one horizontal member and threadingly engaged in the other of said two horizontal members.

8. An article of furniture according to claim 7 wherein each screw is a self-tapping screw which taps a thread in a hole in the other of said two horizontal members when the screw is screwed therein.

9. An article of furniture according to claim 6 wherein the horizontal members are also tubular members.

* * * * *